United States Patent
Yelaverthi et al.

(10) Patent No.: US 10,917,019 B2
(45) Date of Patent: Feb. 9, 2021

(54) QUASI-SINGLE STAGE POWER CONVERTER TOPOLOGY

(71) Applicant: Utah State University, Logan, UT (US)

(72) Inventors: Dorai Babu Yelaverthi, North Logan, UT (US); Regan A Zane, Hyde Park, UT (US)

(73) Assignee: Utah State University, Logan, UT (US)

( * ) Notice: Subject to any disclaimer, the term of this patent is extended or adjusted under 35 U.S.C. 154(b) by 0 days.

(21) Appl. No.: 16/298,962

(22) Filed: Mar. 11, 2019

(65) Prior Publication Data

US 2020/0295663 A1    Sep. 17, 2020

(51) Int. Cl.
*H02M 3/335*    (2006.01)
*H02M 1/15*    (2006.01)
(Continued)

(52) U.S. Cl.
CPC ......... *H02M 3/33569* (2013.01); *H02M 1/08* (2013.01); *H02M 1/15* (2013.01); *H02M 1/44* (2013.01); *H02M 2001/0054* (2013.01)

(58) Field of Classification Search
CPC .... H02M 7/261; H02M 7/268; H02M 7/7575; H02M 7/00; H02M 7/04; H02M 7/217;
(Continued)

(56) References Cited

U.S. PATENT DOCUMENTS 6,046,915 A    4/2000    Jacobs et al.
7,050,311 B2 *    5/2006    Lai .................... H02M 5/225
                                                    363/37
(Continued)

FOREIGN PATENT DOCUMENTS

EP    3113345 A1    1/2017

OTHER PUBLICATIONS

Nando Kaminski, "Failure Rates of HiPak Modules Due to Cosmic Rays", ABB Switzerland Ltd, Application Note 5SYA 2042-02, Nov. 2004, pp. 1-10.
(Continued)

*Primary Examiner* — Nguyen Tran

(57) ABSTRACT

A power converter includes an unfolder with an input connection with three terminals that connect to a three-phase AC power source and that has an output connection with a positive terminal, a negative terminal and a neutral terminal. The unfolder unfolds the bipolar AC voltages into two unipolar piece-wise sinusoidal DC voltages offset from each other by a half of a period. The power converter includes a three-input converter that produces a DC voltage output across output terminals. The three-input converter includes a positive input connection connected to the positive terminal, a negative input connection connected to the negative terminal and a neutral input connection connected to the neutral terminal. The three-input converter includes switches that selectively connect a voltage to the positive, negative and neutral input connections across a primary transformer winding of a transformer. A secondary transformer winding is connected to the output terminals through a rectification section.

20 Claims, 13 Drawing Sheets

(51) Int. Cl.
*H02M 1/44* (2007.01)
*H02M 1/08* (2006.01)
*H02M 1/00* (2006.01)

(58) Field of Classification Search
CPC .......... H02M 7/219; H02M 5/40; H02M 5/42; H02M 5/45; H02M 5/4505; H02M 5/451; H02M 5/452; H02M 5/458; H02M 5/5485; H02M 1/081
USPC .................. 363/34–37, 40–41, 44, 125, 127
See application file for complete search history.

(56) References Cited

U.S. PATENT DOCUMENTS

| 8,411,473 | B2* | 4/2013 | Cheng | H02M 3/337 363/17 |
|---|---|---|---|---|
| 8,644,037 | B2 | 2/2014 | Raju et al. | |
| 2009/0021081 | A1 | 1/2009 | Jacobson et al. | |
| 2010/0039840 | A1* | 2/2010 | Bahai | H02J 7/02 363/65 |
| 2015/0194905 | A1* | 7/2015 | White | H02M 7/21 363/126 |
| 2019/0379291 | A1* | 12/2019 | Xue | H02M 7/219 |

OTHER PUBLICATIONS

Uwe Scheuermann, et al., "Impact of Device Technology on Cosmic Ray Failures in Power Modules", IET Power Electronics, https://www.researchgate.net/publication/303714715, May 2016, pp. 1-10.

Powerex, Inc. "Dual Common Emitter HVIGBT Module 85 Amperes/6500 Volts", QIC6508001 Preliminary, Nov. 2014, pp. 1-7.

Powerex, Inc. "Dual Diode Isolated Module 160 Amperes/6500 Volts", QRD6516001 Preliminary, Nov. 2014, pp. 1-5.

* cited by examiner

T-Type 3 Level                T-Type Rectifier 3 Level

Side cross-section view

Top cross-section view

QUASI-SINGLE STAGE POWER CONVERTER TOPOLOGY

FIELD

This invention relates to power conversion and more particularly relates to a power converter for three-phase alternating current to direct current power transfer and vice-versa.

BACKGROUND

Traditional three-phase alternating current ("AC") to direct current ("DC") converters include a rectification section that rectifies AC power to provide a stiff DC link which feeds a DC to DC converter. Often a large capacitor is used on the DC link that is bulky and is prone to failure. A simple full-bridge rectification section does not control harmonics or power factor correction, which often requires additional components. To meet harmonic and power factor correction concerns, often an active power factor correction circuit is used in the rectification section. System level efficiency of this traditional two-stage approach tends to be lower since both the rectifier section and DC to DC converter have switching and conduction losses. The volume of the converter is high since each section requires filtering of the switching harmonics.

Where the three-phase AC to DC converter is fed by higher voltages, such as a medium voltage grid, various means are used to convert the input voltage to a lower voltage. One approach is to use a transformer, which is bulky and expensive. Other solid-state approaches use stacked converters where each converter is typically a single-phase converter. This approach has limitations, such as hard-switching issues, efficiency issues, etc. and requires line frequency energy buffering DC link capacitors since the approach does not take advantage of the characteristics of three-phase power.

SUMMARY

A power converter for AC to DC power transfer includes an unfolder with an input connection that has three input terminals that connect to a three-phase AC power source and that has an output connection with a positive terminal, a negative terminal and a neutral terminal. The unfolder unfolds the bipolar AC voltages into two unipolar piece-wise sinusoidal DC voltages offset from each other by a half of a period. The power converter includes a three-input converter that produces a DC voltage output across output terminals. The three-input converter includes a positive input connection connected to the positive terminal, a negative input connection connected to the negative terminal and a neutral input connection connected to the neutral terminal. The three-input converter includes switches that selectively connect a voltage to the positive, negative and neutral input connections across a primary transformer winding of a transformer. A secondary transformer winding of the transformer is connected to the output terminals through a rectification section.

Another power converter for AC to DC power transfer includes an unfolder with an input connection with three input terminals that connect to a three-phase AC power source and includes an output connection with a positive terminal, a negative terminal and a neutral terminal. The unfolder unfolds the bipolar AC voltages into two unipolar piece-wise sinusoidal DC voltages offset from each other by a half of a period. The power converter includes a plurality of three-input converters that produce a DC voltage output across output terminals. Each three-input converter includes a first primary transformer winding and a second primary transformer winding with at least one secondary transformer winding connected to a rectification section which is connected to the output terminals. Each three-input converter includes switches to connect two positive input connections to the first primary transformer winding and switches to connect two negative input connections to the second primary transformer winding. The positive input connections of the plurality of three-input converters are connected in series between the positive terminal and the neutral terminal, the negative input connections of the plurality of three-input converters are connected in series between the neutral terminal and the negative terminal, and the output terminals of the plurality of three-input converters are connected in parallel.

Another power converter for AC to DC power transfer includes an unfolder with an input connection that has three input terminals that connect to a three-phase AC power source and an output connection with a positive terminal, a negative terminal and a neutral terminal, where the unfolder unfolds the bipolar AC voltages into two unipolar piece-wise sinusoidal DC voltages offset from each other by a half of a period. The power converter includes a three-input converter that produces a DC voltage output across output terminals. The three-input converter includes a positive input connection connected to the positive terminal, a negative input connection connected to the negative terminal and a neutral input connection connected to the neutral terminal. The three-input converter includes switches that selectively connect a voltage to the positive, negative and neutral input connections across a primary transformer winding of a transformer. A secondary transformer winding of the transformer is connected to the output terminals through a rectification section.

The power converter includes a controller, where the transformer includes one or two primary transformer windings and the controller closes switches of the three-input converter during a portion of a switching cycle to simultaneously connect a voltage from the positive terminal to the neutral terminal across a primary transformer winding and connect a voltage from the neutral terminal to the negative terminal across a primary transformer winding during a first portion of a duty cycle, to connect a voltage from the positive terminal to the neutral terminal across a primary transformer winding while a voltage from the neutral terminal to the negative terminal is not connected to a primary transformer winding during a second portion of the duty cycle, to connect a voltage from the neutral terminal to the negative terminal across a primary transformer winding while a voltage from the positive terminal to the neutral terminal is not connected to a primary transformer winding during a second portion of the duty cycle, to connect switches of the three-input converter so voltage across a primary transformer winding is zero. The controller selects the first portion of the duty cycle and the second portion of the duty cycle to match current through the positive terminal and current through the negative terminal to current reference signals. Current through the positive terminal and current through the negative terminal matching the current reference signals enable the controller to direct switches of the unfolder to produce sinusoidal currents at the input terminals to the unfolder.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
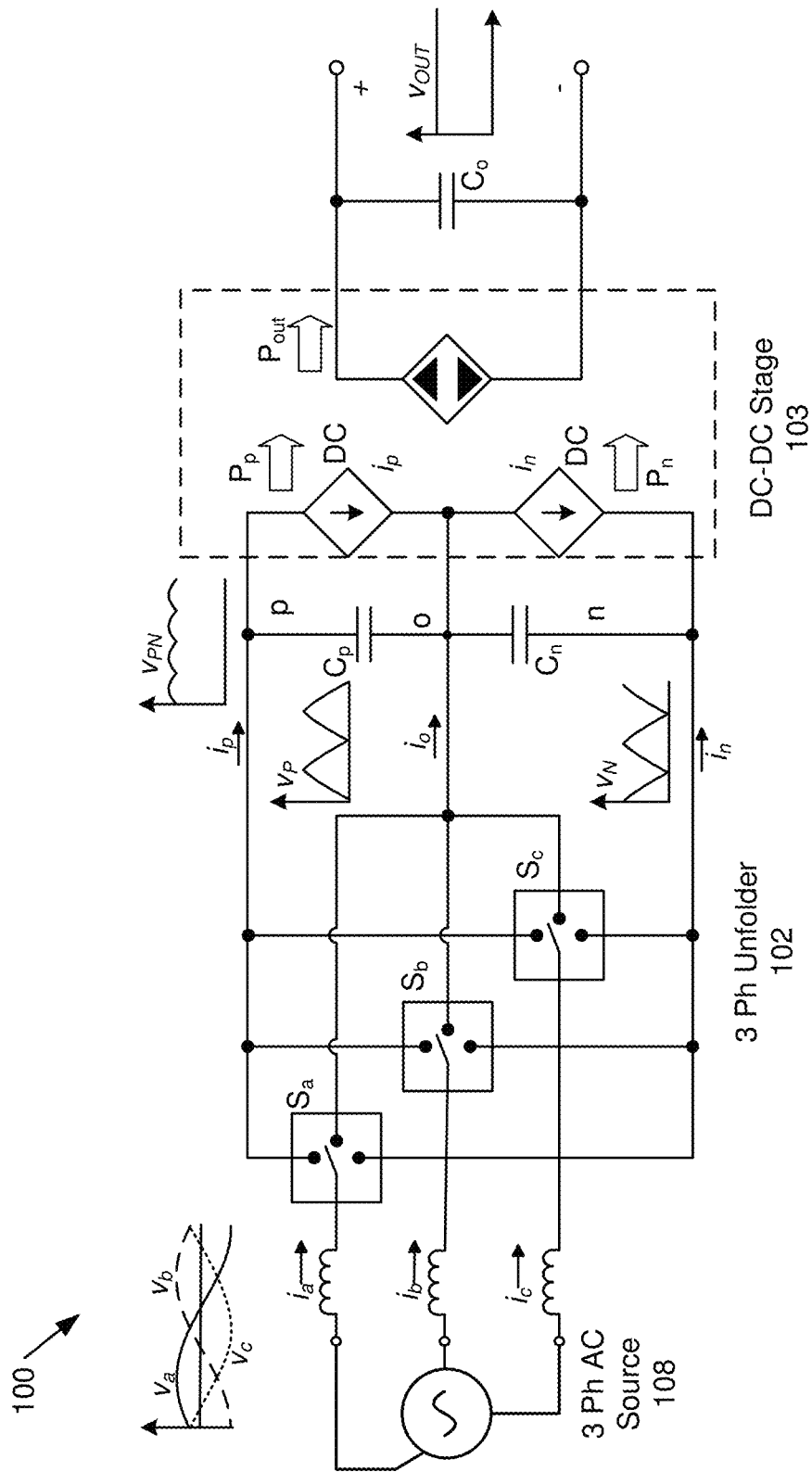
FIG. 1 is a schematic block diagram illustrating one embodiment of a conceptual power converter with an unfolder and a DC-DC stage.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "controller," or "system." Furthermore, aspects of the present invention may take the form of a computer program product embodied in one or more computer readable medium(s) having program code embodied thereon.

Many of the functional units described in this specification have been labeled as controllers, in order to more particularly emphasize their implementation independence. For example, a controller may be implemented as a hardware circuit comprising custom VLSI circuits or gate arrays, off-the-shelf semiconductors such as logic chips, transistors, or other discrete components. A controller may also be implemented in programmable hardware devices such as field programmable gate arrays, programmable array logic, programmable logic devices or the like.

Controllers may also be partially implemented in software for execution by various types of processors. An identified controller of program code may, for instance, comprise one or more physical or logical blocks of computer instructions which may, for instance, be organized as an object, procedure, or function. Nevertheless, the executables of an identified controller need not be physically located together, but may comprise disparate instructions stored in different locations which, when joined logically together, comprise the controller and achieve the stated purpose for the controller.

Indeed, a controller of program code may be a single instruction, or many instructions, and may even be distributed over several different code segments, among different programs, and across several memory devices. Similarly, operational data may be identified and illustrated herein within controllers, and may be embodied in any suitable form and organized within any suitable type of data structure. The operational data may be collected as a single data set, or may be distributed over different locations including over different storage devices, and may exist, at least partially, merely as electronic signals on a system or network. Where a controller or portions of a controller are implemented in software, the program code may be stored and/or propagated on in one or more computer readable medium(s).

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in flowchart and/or block diagram block or blocks.

Although various arrow types and line types may be employed in flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

A power converter for alternating current ("AC") to direct current ("DC") power transfer includes an unfolder with an input connection that has three input terminals that connect to a three-phase AC power source and that has an output connection with a positive terminal, a negative terminal and a neutral terminal. The unfolder unfolds the bipolar AC voltages into two unipolar piece-wise sinusoidal DC voltages offset from each other by a half of a period. The power converter includes a three-input converter that produces a DC voltage output across output terminals. The three-input converter includes a positive input connection connected to the positive terminal, a negative input connection connected to the negative terminal and a neutral input connection connected to the neutral terminal. The three-input converter includes switches that selectively connect a voltage to the positive, negative and neutral input connections across a primary transformer winding of a transformer. A secondary transformer winding of the transformer is connected to the output terminals through a rectification section.

In some embodiments, a voltage across the positive terminal and the negative terminal is a DC voltage with an AC ripple and a voltage range of a voltage across the positive terminal to the neutral terminal overlaps a voltage range of a voltage across the negative terminal to the neutral terminal. In other embodiments, a switching frequency of switches in the three-input converter is at least 100 times a switching frequency of the unfolder. In other embodiments, the three-input converter includes a first primary transformer winding and a second primary transformer winding with at least one secondary transformer winding connected to a rectification section connected to the output terminals. The three-input converter includes switches to connect each of the positive and neutral terminals to the first primary transformer winding and switches to connect each of the negative and neutral terminals to the second primary transformer winding.

In other embodiments, the three-input converter includes a plurality of three-input converters where each three-input converter has two positive input connections connected to switches to connect to the first primary transformer winding of the three-input converter and two negative input connections connected to switches to connect to the second primary transformer winding. The positive input connections of the plurality of three-input converters are connected in series between the positive terminal and the neutral terminal and the negative input connections of the plurality of three-input converters are connected in series between the negative terminal and the neutral terminal and wherein output terminals of the plurality of three-input converters are connected in parallel. In further embodiments, the unfolder includes one or more switches connected between the neutral terminal and each of the input terminals of the unfolder, where the one or more switches between an input terminal of the unfolder and the neutral terminal are rated for voltages of the AC power source and where switches of the plurality of three-input converters connected to a primary transformer winding are rated for voltages across the positive terminal, negative terminal and neutral terminal divided by the number of three-input converters of the plurality of three-input converters.

In some embodiments, the transformer includes one or two primary transformer windings and the power converter has a controller that closes switches of the three-input converter during a portion of a switching cycle to simultaneously connect a voltage from the positive terminal to the neutral terminal across a primary transformer winding and connect a voltage from the negative terminal to the neutral terminal across a primary transformer winding during a first portion of a duty cycle, connect a voltage from the positive terminal to the neutral terminal across a primary transformer winding while a voltage from the negative terminal to the neutral terminal is not connected to a primary transformer winding during a second portion of the duty cycle, connect a voltage from the negative terminal to the neutral terminal across a primary transformer winding while a voltage from the positive terminal to the neutral terminal is not connected to a primary transformer winding during a second portion of the duty cycle, and connect switches of the three-input converter so voltage across a primary transformer winding is zero.

In further embodiments, the controller selects the first portion of the duty cycle and the second portion of the duty cycle to match current through the positive terminal and current through the negative terminal to current reference signals. Current through the positive terminal and current through the negative terminal matching the current reference signals enable the controller to direct switches of the unfolder to produce sinusoidal currents at the input terminals to the unfolder.

In some embodiments, the unfolder includes a full-bridge rectification section connecting each of the three input terminals of the unfolder to the positive terminal and the negative terminal and switches connecting each of the three input terminals to the neutral terminal. In further embodiments, the full-bridge rectification section includes diodes and/or switches. In other further embodiments, the switches switch at a frequency that is twice a fundamental frequency of the AC power source.

In some embodiments, the three-input converter is a resonant converter and includes inductance and capacitance on a primary side of the transformer sufficient for the switches of the three-input converter to switch in a zero-voltage-switching mode. In other embodiments, the rectification section of the three-input converter includes a full-bridge rectifier. In other embodiments, the unfolder and three-input converter are operated to produce a first power waveform measured at the positive terminal and neutral terminal and a second power waveform measured at the negative terminal and the neutral terminal where the first power waveform is offset from the second power waveform by a half of a cycle of the power waveforms and where the first power waveform and the second power waveform add to produce a constant power waveform. In other embodiments, the primary transformer winding includes a primary transfer pad and the secondary transformer winding includes a secondary transfer pad, where the primary transfer pad and the secondary transfer pad are each configured for wireless power transfer with a gap between the primary transfer pad and the secondary transfer pad.

Another power converter for AC to DC power transfer includes an unfolder with an input connection with three input terminals that connect to a three-phase AC power source and includes an output connection with a positive terminal, a negative terminal and a neutral terminal. The unfolder unfolds the bipolar AC voltages into two unipolar piece-wise sinusoidal DC voltages offset from each other by a half of a period. The power converter includes a plurality of three-input converters that produce a DC voltage output across output terminals. Each three-input converter includes a first primary transformer winding and a second primary transformer winding with at least one secondary transformer winding connected to a rectification section which is connected to the output terminals. Each three-input converter includes switches to connect two positive input connections to the first primary transformer winding and switches to connect two negative input connections to the second primary transformer winding. The positive input connections of the plurality of three-input converters are connected in series between the positive terminal and the neutral terminal, the negative input connections of the plurality of three-input converters are connected in series between the neutral terminal and the negative terminal, and the output terminals of the plurality of three-input converters are connected in parallel.

In some embodiments, the power converter includes a controller that closes switches of the plurality of three-input converters during a portion of a switching cycle to:

simultaneously connect a voltage from the positive terminal to the neutral terminal across a primary transformer winding and connect a voltage from the negative terminal to the neutral terminal across a primary transformer winding during a first portion of a duty cycle, connect a voltage from the positive terminal to the neutral terminal across a primary transformer winding while a voltage from the negative terminal to the neutral terminal is not connected to a primary transformer winding during a second portion of the duty cycle, connect a voltage from the negative terminal to the neutral terminal across a primary transformer winding while a voltage from the positive terminal to the neutral terminal is not connected to a primary transformer winding during a second portion of the duty cycle, connect switches of the three-input converters so voltage across the first primary winding is zero, and connect switches of the three-input converters so voltage across the second primary winding is zero.

In further embodiments, the controller selects the first portion of the duty cycle and the second portion of the duty cycle to match current through the positive terminal and current through the negative terminal to current reference signals. Current through the positive terminal and current through the negative terminal matching the current reference signals enable the controller to direct switches of the unfolder to produce sinusoidal currents at the input terminals to the unfolder. In other embodiments, the unfolder includes a full-bridge rectification section connecting each of the three input terminals of the unfolder to the positive terminal and the negative terminal and switches connecting each of the three input terminals to the neutral terminal.

Another power converter for AC to DC power transfer includes an unfolder with an input connection that has three input terminals that connect to a three-phase AC power source and an output connection with a positive terminal, a negative terminal and a neutral terminal, where the unfolder unfolds the bipolar AC voltages into two unipolar piece-wise sinusoidal DC voltages offset from each other by a half of a period. The power converter includes a three-input converter that produces a DC voltage output across output terminals. The three-input converter includes a positive input connection connected to the positive terminal, a negative input connection connected to the negative terminal and a neutral input connection connected to the neutral terminal. The three-input converter includes switches that selectively connect a voltage to the positive, negative and neutral input connections across a primary transformer winding of a transformer. A secondary transformer winding of the transformer is connected to the output terminals through a rectification section.

The power converter includes a controller, where the transformer includes one or two primary transformer windings and the controller closes switches of the three-input converter during a portion of a switching cycle to simultaneously connect a voltage from the positive terminal to the neutral terminal across a primary transformer winding and connect a voltage from the neutral terminal to the negative terminal across a primary transformer winding during a first portion of a duty cycle, to connect a voltage from the positive terminal to the neutral terminal across a primary transformer winding while a voltage from the neutral terminal to the negative terminal is not connected to a primary transformer winding during a second portion of the duty cycle, to connect a voltage from the neutral terminal to the negative terminal across a primary transformer winding while a voltage from the positive terminal to the neutral terminal is not connected to a primary transformer winding during a second portion of the duty cycle, to connect switches of the three-input converter so voltage across a primary transformer winding is zero. The controller selects the first portion of the duty cycle and the second portion of the duty cycle to match current through the positive terminal and current through the negative terminal to current reference signals. Current through the positive terminal and current through the negative terminal matching the current reference signals enable the controller to direct switches of the unfolder to produce sinusoidal currents at the input terminals to the unfolder.

Figure 2:
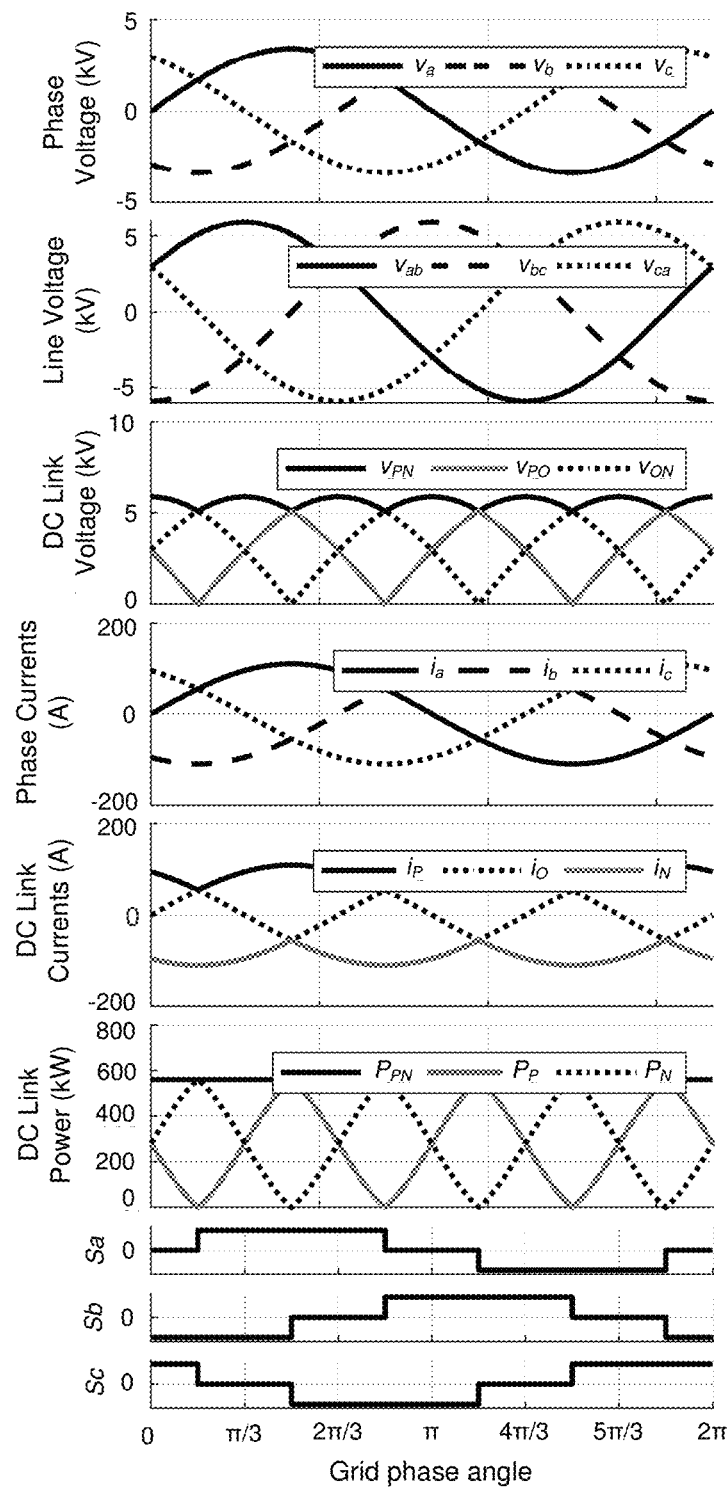
FIG. 2 depicts one embodiment of simulation waveforms for the power converter of FIG. 1.

FIG. 1 is a schematic block diagram illustrating one embodiment of a conceptual power converter 100 with an unfolder 102 and a DC-DC stage 103. The power converter 100 includes two parts, an unfolder 102 and a DC-DC stage 103. Functionally, the unfolder 102 includes three single-pole triple-throw ("SPTT") switches $S_a$, $S_b$, $S_c$ (See FIG. 3). The switches $S_a$, $S_b$, $S_c$ can be connected to either 'P', 'O' or 'N' terminals of the dc-link. The unfolder switches $S_a$, $S_b$, $S_c$ are sequenced such that the instantaneous highest phase voltage connects to the 'P' terminal and instantaneous lowest phase voltage connects to the 'N' terminal, and the remaining phase gets connected to the midpoint rail 'O'. This way the unfolder 102 DC-side generates two soft DC link voltages $V_{PO}$ and $V_{ON}$ which are piece-wise sinusoidal as shown in FIG. 2.

Figure 4A:
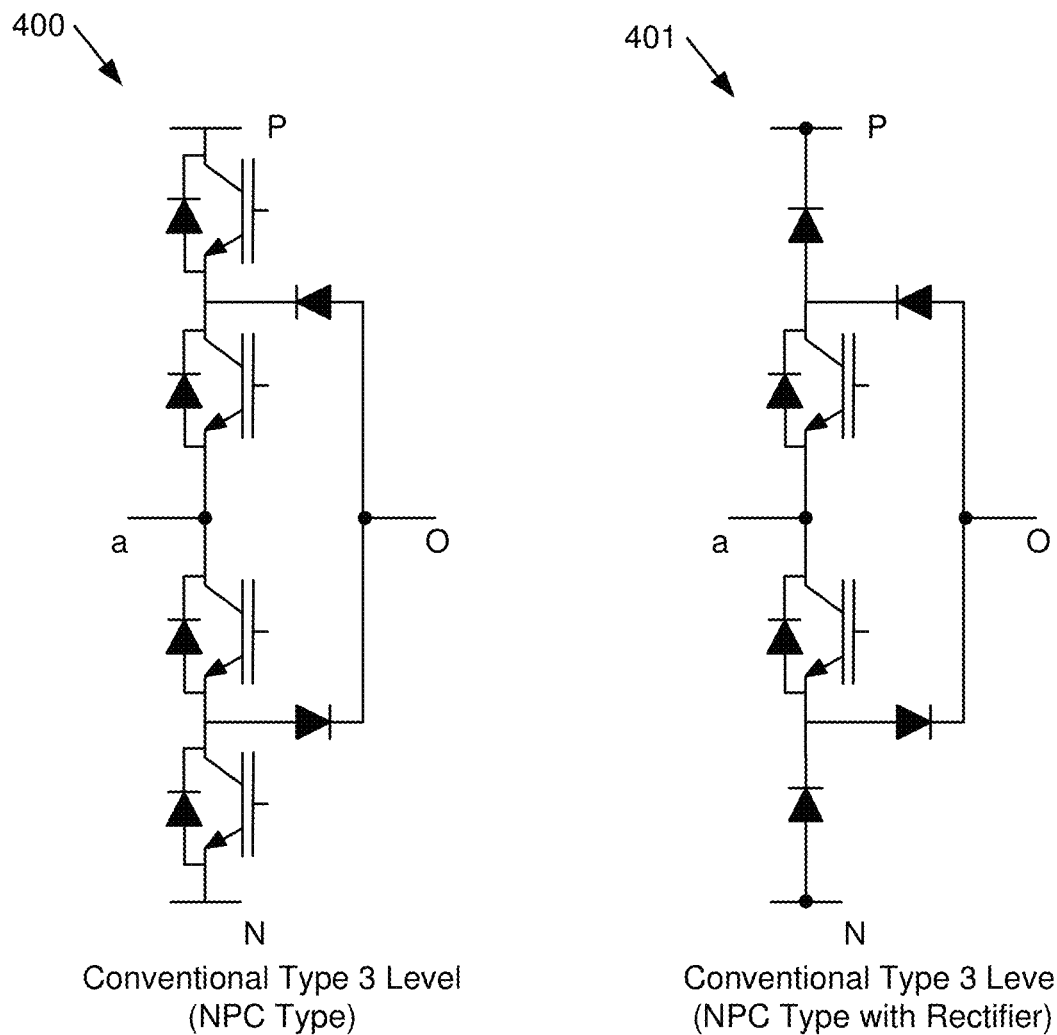
FIG. 4A is a schematic block diagram illustrating one embodiment of conventional-type three-level neutral point clamped ("NPC")-type switching circuits
Figure 4B:
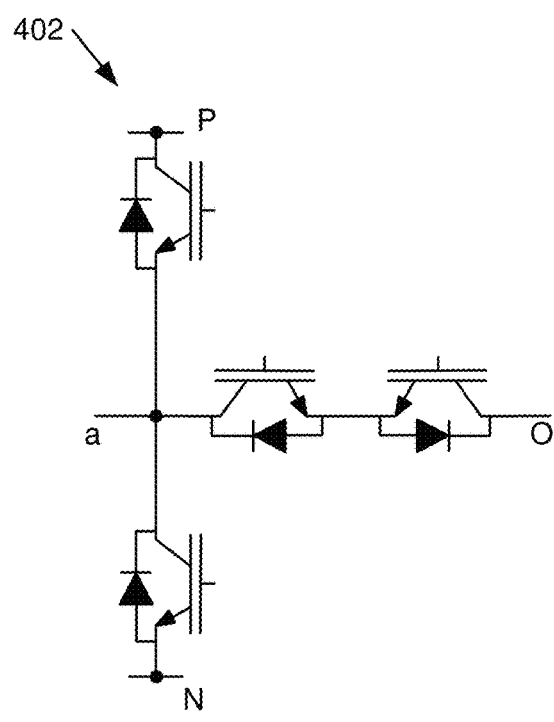
FIG. 4B is a schematic block diagram illustrating one embodiment of T-type three-level switching circuits.
Figure 4B:
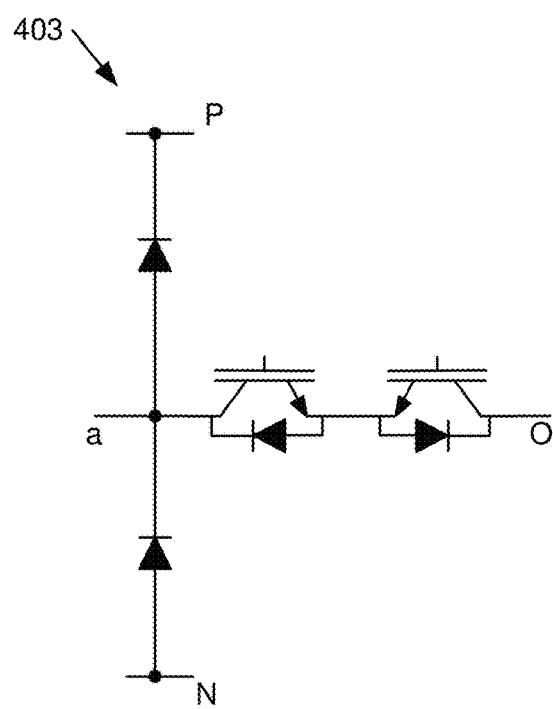

The SPTT switches of the unfolder 102 can be implemented in many ways (See FIGS. 4A and 4B.) Electrically, the SPTT switches can be implemented by traditional 3-level switch legs like the NPC 3-level leg or T-type 3-level legs. For unidirectional power flow from 3-phase AC to DC, rectifier variants of the 3-level legs can be used. Other embodiments that can functionally achieve the SPTT switch can also be used.

The second stage of the converter is called a DC-DC stage. This DC-DC converter is a three-port converter, where two of the ports, "PO" and "ON," connect to the soft DC link voltages $V_{PO}$ and $V_{ON}$ and the third port connects to a stiff DC port. For AC to DC power flow, the soft DC link ports can be seen as input ports and the stiff DC port as output port. Vice-versa is true if the power flows in the opposite direction. The currents drawn from the soft-dc links $i^{dc}_p$ and $i^{dc}_n$ b$_y$ the dc-dc stage are such that sinusoidal currents result on the grid side. The capacitor $C_P$ and $C_N$ are designed to filter out the switching ripple produced by the DC-DC stage 103.

Figure 7:
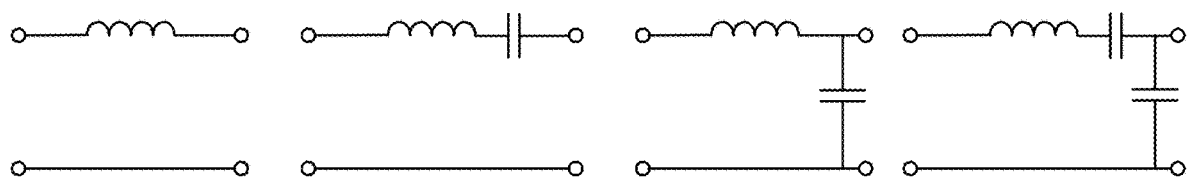
FIG. 7 is a schematic block diagram illustrating options for passive resonant circuits.

The objective of the DC-DC stage 103 is to simultaneously use the two soft time varying dc-link voltages to generate a high frequency ("HF"), typically in range of 10 kilohertz to 10 megahertz, multilevel voltage waveform. In other embodiments, the switching frequency is below 10 kilohertz or above 10 megahertz. The switching mechanisms selectively connects to a primary of a transformer of the DC-DC stage 103 (See FIG. 10) to either the full dc link voltage $V_{PN}$ or only one of the two soft dc-link voltage $V_{PO}$ and $V_{ON}$. The relative times for which $V_{PO}$ and $V_{ON}$ are connected to the transformer are used to control the grid currents. The HF multilevel waveform is applied across a rectifier through a transformer. In some the embodiments, the waveform is processed through a passive circuit, typically a resonant circuit, before being applied to a common rectifier. This passive circuit can be physically connected to any of the transformer windings but is functionally shown to be lumped on the secondary side in the embodiments for the DC-DC stage 103. Various embodiments are possible for the passive circuit are shown in FIG. 7.

FIG. 2 depicts one embodiment of simulation waveforms for the power converter 100 of FIG. 1. For all of the waveforms, time is the variable for the horizontal axis. The top waveform depicts input phase voltages from the AC power source 108 and the second waveform depicts input line-to-line voltages of the AC power source 108. Note that the voltage waveforms are offset by 120 degrees.

The third waveform labeled DC Link Voltage includes voltages at the three output terminals of the unfolder 102. The solid waveform is voltage $V_{PN}$ across the positive terminal P to the negative terminal N, which includes a DC component with an AC voltage ripple matching peak voltages of the line-to-line voltages of the second waveform. The DC Link Voltage waveforms also include voltage $V_{PO}$, which is voltage from the neutral terminal O to the positive terminal P and voltage $VO_N$, which is voltage from the negative terminal N to the neutral terminal O. Note that the voltage $V_{PO}$ is 180 degrees out of phase with voltage $V_{ON}$. A voltage range of a voltage $V_{PO}$ across the negative terminal O to the negative terminal P overlaps a voltage range of a voltage $V_{ON}$ across the negative terminal N to the neutral terminal O.

The fourth waveform labeled Phase Currents $i_a$, $i_b$, $i_c$ are currents at the input of the unfolder 102 and the fifth waveform labeled DC Link Currents $i_P$, $i_O$, $i_N$ are currents at the positive terminal P, neutral terminal O and negative terminal N. Note that the unfolder 102 controls switches $S_a$, $S_b$, $S_c$ so that portions of DC Link Currents $i_P$, $i_O$, $i_N$ to produce the Phase Currents $i_a$, $i_b$, $i_c$. Switch timing for the switches $S_a$, $S_b$, $S_c$ of the unfolder 102 is depicted in the bottom waveform. The sixth waveform is labeled DC Link Power and depicts power $P_{PN}$ at the positive terminal P to negative terminal N interface, power $P_P$ at the positive terminal P, and power $P_N$ at the negative terminal N. Note that power $P_{PN}$ is constant while power $P_P$ at the positive terminal P and power $P_N$ at the negative terminal N vary over time and add to the power $P_{PN}$. While the waveforms appear to be smooth, switching of the DC-DC stage 103 produces ripple within the waveforms of FIG. 2 and the ripple is not depicted due to creating black and white waveforms with dashes to distinguish between waveforms.

In some embodiments, a three-input converter includes a first primary transformer winding and a second primary transformer winding with at least one secondary transformer winding connected to a rectification section connected to the output terminals, where the three-input converter has switches to connect each of the positive and neutral terminals P, O, to the first primary transformer winding and switches to connect each of the negative and neutral terminals N, O, to the second primary transformer winding. In some embodiments, the three-input converter includes a single transformer with two primary transformer windings and one secondary transformer winding.

Figure 9:
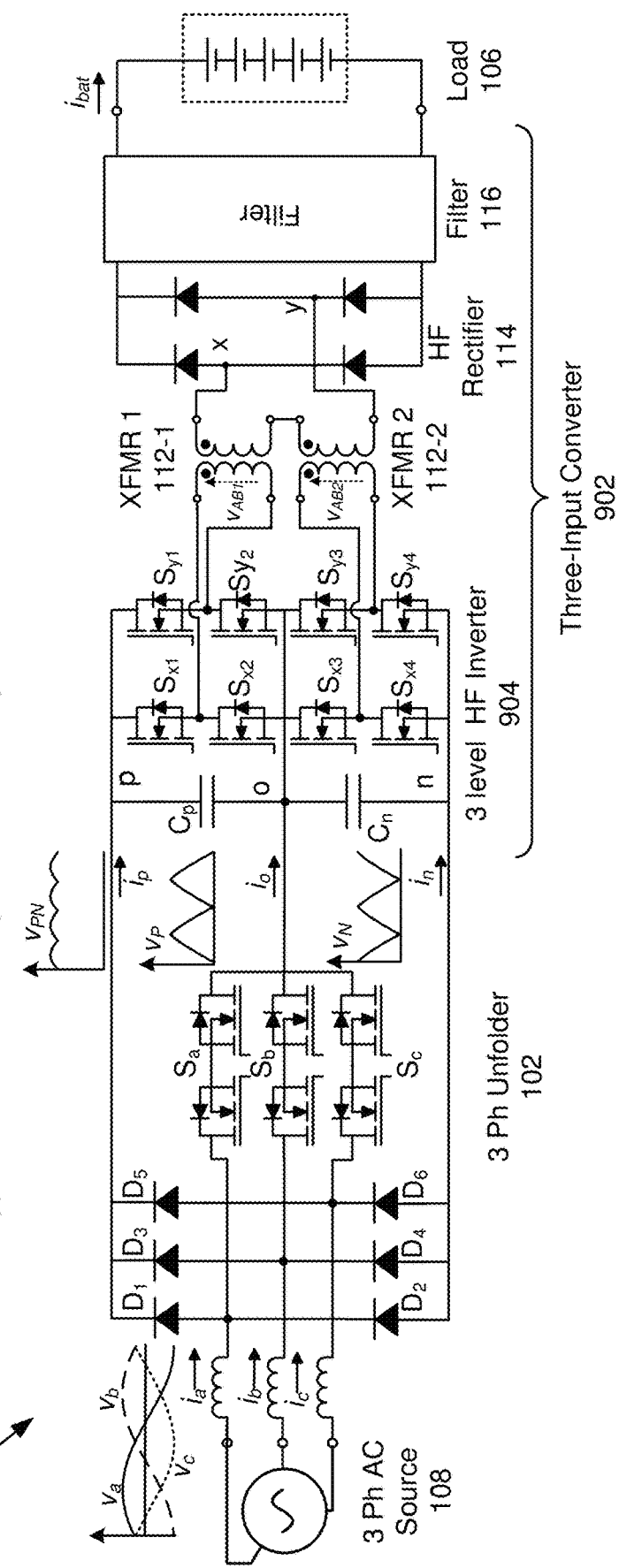
FIG. 9 is a schematic block diagram illustrating one embodiment of a power converter with an unfolder and a three-input converter with two primary transformer windings and two secondary windings connected in series.

In other embodiments, the three-input converter includes two transformers where each transformer includes a primary transformer winding and a secondary transformer winding and the secondary windings are connected in series. An example of this this embodiment is depicted in FIG. 9. One of skill in the art will recognize other transformer configurations.

Figure 3:
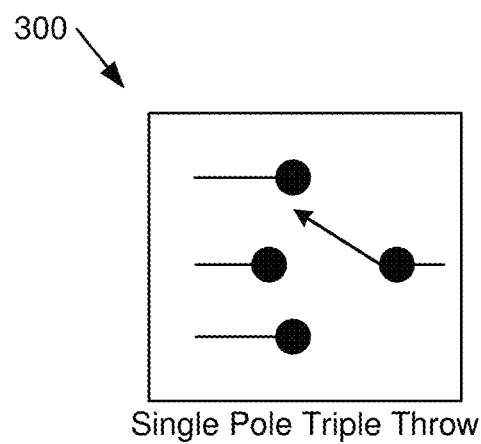
FIG. 3 is a schematic block diagram illustrating one embodiment of a single-pole triple-throw switch.

FIG. 3 is a schematic block diagram illustrating one embodiment of a single-pole triple-throw switch 300. The single-pole triple-throw switch 300 is a mechanical representation of a conventional use of the 3-level DC-DC stage 103 of the power converter 100.

FIG. 4A is a schematic block diagram illustrating one embodiment of a conventional-type three-level neutral point clamped ("NPC")-type switching circuit 400 and a conventional-type three-level NPC-type rectifier switching circuit 401. FIG. 4B is a schematic block diagram illustrating one embodiment of a T-type three-level switching circuit 402 and a T-type three-level rectifier switching circuit 403. Both types of circuits 400-403 function in a similar way. The T-type three-level switching circuits 402, 403 include less components and is depicted in the power converter 800 of FIG. 8. Note that the conventional-type three-level T-type switching circuit 402 is used in some embodiments.

Figure 5:
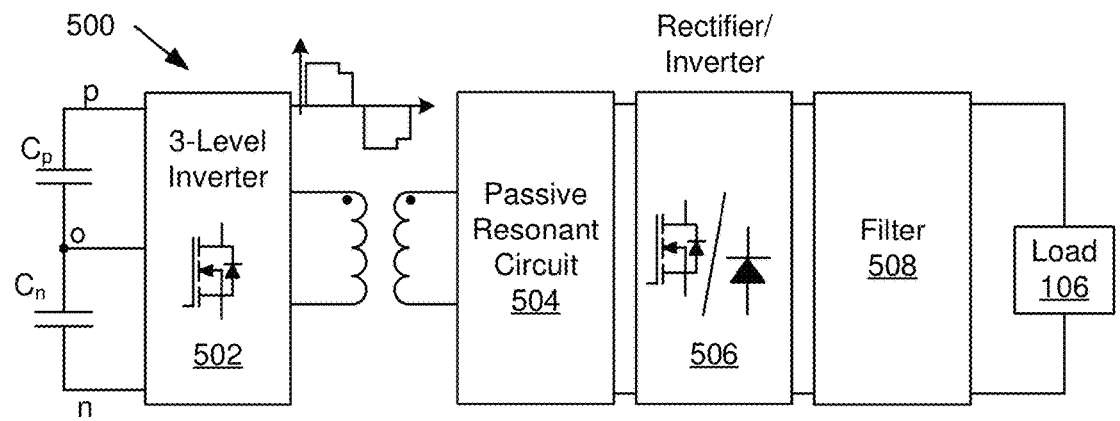
FIG. 5 is a schematic block diagram illustrating another embodiment of a conceptual power converter with a DC-DC stage with a transformer with a 3-level inverter, a single primary winding and a second secondary winding.

FIG. 5 is a schematic block diagram illustrating another embodiment of a conceptual power converter 500 with a DC-DC stage 103 with a 3-level inverter, a transformer with a single primary winding and a second secondary winding. In some embodiments, possible embodiments for the DC-DC stage 103 can be broadly classified into two approaches. In the first approach, a high-frequency switching circuit that uses the two soft-link voltages simultaneously to generate a multi-level high frequency voltage waveform. Various 3-level leg-based inverter can be used to realize the 3-level inverter 502. The relative duty of the each of the dc link voltage used to generate the high frequency AC waveform is selectively changed to control the currents from each of the capacitors and thereby control the grid currents. The rectifier/inverter block 506 can be any traditional rectifier, either passive or active rectifier. In case of active rectifier, the duty cycle of the square wave and relative phase shift can be additionally used as control variables to regulate power to the stiff DC side.

Figure 6:
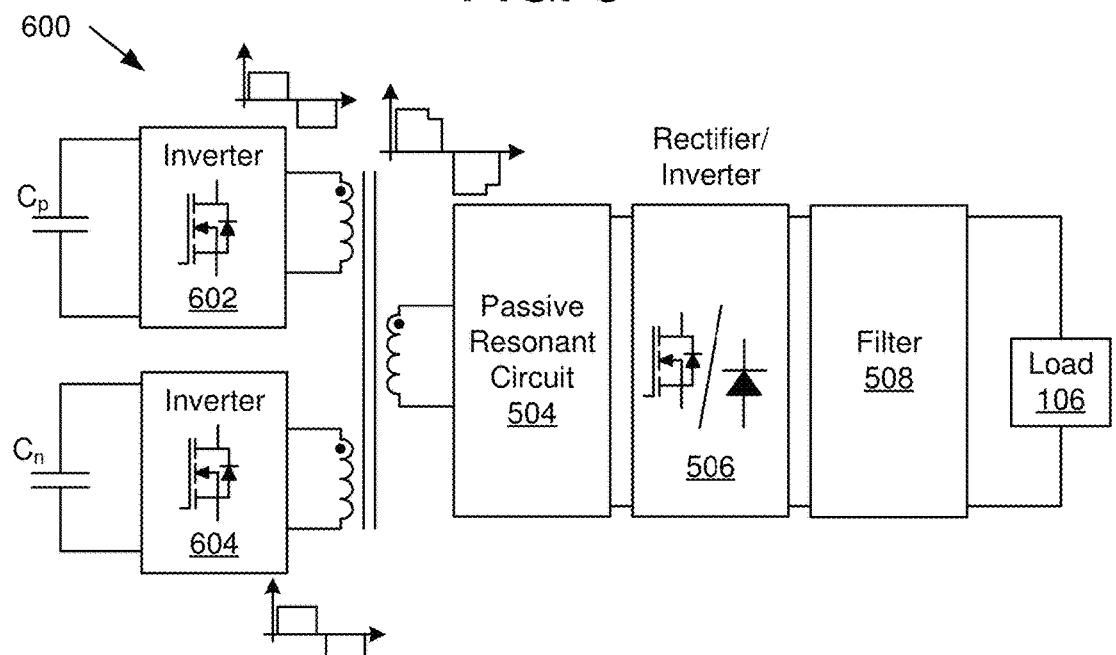
FIG. 6 is a schematic block diagram illustrating another embodiment of a conceptual power converter with a DC-DC stage with a transformer with two inverters for two primary winding and a second secondary winding.

FIG. 6 is a schematic block diagram illustrating another embodiment of a conceptual power converter 600 with a DC-DC stage 103 with a transformer with two inverters for two primary winding and a second secondary winding. In the second approach depicted in FIG. 6, each capacitor has an inverter connected that is generating a quasi-square wave high-frequency voltage across the primary winding. The pulse-widths and the relative phase-shift between the quasi-square wave voltage are selectively adjusted to control the currents from each of the capacitors. The transformer is such that the net flux linkage from the two primary windings add up on the secondary to produce a multilevel waveform. Two separate traditional two-winding transformers can be used or an integrated magnetic approach (see FIGS. 14, 15) which only has one secondary can be used. The inverter block 602, 604 can either half bridge, full bridge or in general any switch network that is able to generate a square wave or quasi-square wave.

Figure 8:
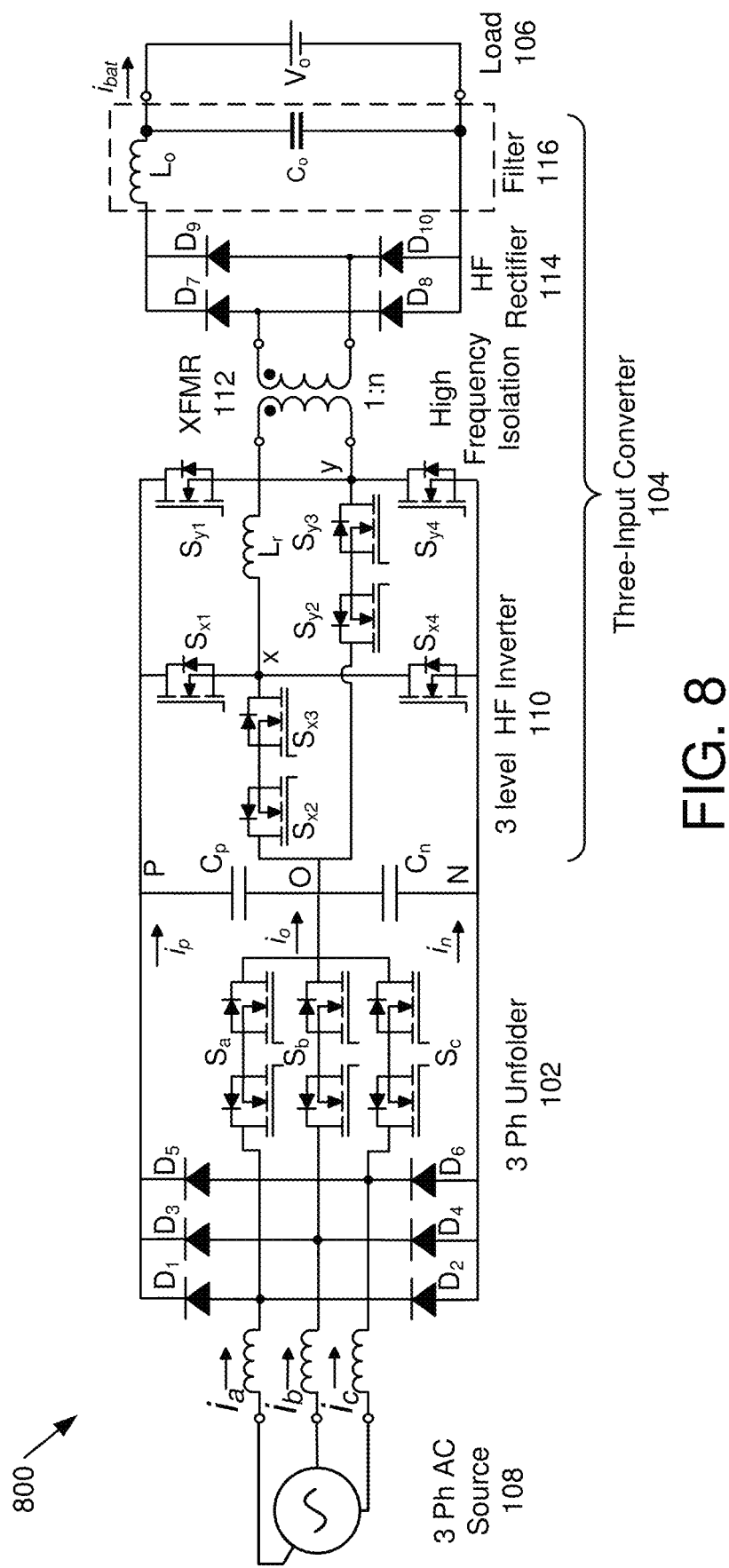
FIG. 8 is a schematic block diagram illustrating one embodiment of a power converter with an unfolder and a single stage T-type three-input converter feeding a DC load.

FIG. 8 is a schematic block diagram illustrating one embodiment of a power converter 800 with an unfolder 102 and a single stage T-type three-input converter 104 feeding a DC load 106. The power converter 800 is fed from a three-phase AC power source 108, such as a utility, a generator, etc. The three-phase AC power source 108 may include three connections, as depicted in FIG. 8, or may also include a neutral connection. A safety ground (equipment grounding conductor) is typically included, but not shown. The unfolder 102 typically does not include a neutral connection, but may include a safety ground connection for connection to a chassis or other parts for ground fault current.

The unfolder 102 includes a full-bridge rectifier connected to the positive terminal P and negative terminal N in the form of diodes D1-D6. In other embodiments, the diodes D1-D6 may be replaced with switches. A typical rectification section for a converter includes a full-bridge rectifier. The unfolder 102 includes switches $S_a$, $S_b$, $S_c$ connected from each of the three phase connections to a neutral terminal O, which provides additional flexibility as will be explained in more detail below. The switches $S_a$, $S_b$, $S_c$ are typically semiconductors switches. The switches $S_a$, $S_b$, $S_c$ typically experience both positive and negative voltages so where the switches $S_a$, $S_b$, $S_c$ are of a type that includes a body diode, such as an insulated gate bipolar transistor ("IGBT") or a metal oxide field effect transistor ("MOSFET"), the switches $S_a$, $S_b$, $S_c$ may be placed in a back-to-back orientation as depicted to block current when switched off. Each set of switches (e.g. $S_a$), in some embodiments, are both turned on at the same time, which avoids higher conduction losses of using a body diode and which also provides a simpler control scheme than determining which switch to use for a particular voltage condition.

The switches $S_a$, $S_b$, $S_c$ provide a voltage waveform at the neutral terminal O useful for connection to the three-input converter 104. The switches $S_a$, $S_b$, $S_c$ are controlled to produce a voltage Vp across the positive terminal P to the neutral terminal O which is a unipolar piece-wise sinusoidal DC waveform, that appears to be a semi-triangular waveform, made up of rising and falling portions of the input voltages from the three-phase AC power source 108. Similarly, the switches $S_a$, $S_b$, $S_c$ are controlled to produce a voltage $V_N$ across the negative terminal P to the neutral terminal O which is also a unipolar piece-wise sinusoidal DC waveform made up of rising and falling portions of the input voltages from the three-phase AC power source 108 and is a half of a period (i.e. 180 degrees) out of phase from the voltage $V_P$. The voltage $V_{PN}$ across the positive terminal P to the negative terminal N is a DC voltage with a ripple, such as the $V_{PN}$ waveform, as in the third waveform of FIG. 2. The waveforms on a shorter time scale are described in more detail with respect to FIG. 10.

The three-input converter 104 produces a DC voltage output across output terminals and includes three input connections, where a positive input connection is connected to the positive terminal P, a negative input connection is connected to the negative terminal N and a neutral input connection is connected to the neutral terminal O. The three-input converter 104 includes switches $S_{X1\text{-}3}$, $S_{Y1\text{-}3}$ that selectively connect a voltage the positive, negative and neutral input connections across a primary transformer winding of a transformer 112, where a secondary transformer winding of the transformer 112 is connected to the output terminals through a rectification section 114.

The three-input converter 104 includes a switch Sxi from the positive terminal P to a point x, switches $S_{X2}$, $S_{X3}$ connected between the neutral terminal O and the point x, and a switch $S_{X4}$ between the negative terminal N and the point x, where the point x is connected to the positive side of a high-frequency isolation transformer 112 through an inductor $L_r$. In addition, the three-input converter 104 includes a switch $S_{Y1}$ from the positive terminal P to a point y, switches $S_{Y2}$, $S_{Y3}$ connected between the neutral terminal O and the point y, and a switch $S_{Y4}$ between the negative terminal N and the point y, where the point y is connected to the negative side of the transformer 112. The switches $S_{X1\text{-}3}$, $S_{Y1\text{-}3}$ form a 3-level high-frequency inverter 110.

A switching frequency of switches $S_{X1\text{-}3}$, $S_{Y1\text{-}3}$ in the three-input converter 104 is typically much higher than a switching frequency of switches $S_a$, $S_b$, $S_c$ the unfolder 102. In some embodiments, the switching frequency of switches $S_{X1\text{-}3}$, $S_{Y1\text{-}3}$ in the three-input converter 104 is at least 100 times higher than the switching frequency of switches $S_a$, $S_b$, $S_c$ the unfolder 102. Typically, the switching frequency of switches $S_a$, $S_b$, $S_c$ of the unfolder 102 is twice the fundamental frequency of the AC power source 108.

The secondary side of the transformer 112 is connected to a rectification section 114, which is connected to a filter 116, and then to the load 106. In the depicted embodiment, the rectification section 114 includes a full-bridge rectifier with diodes $D_{7\text{-}10}$. Other embodiments include a different rectification section, such as a simple diode rectifier, an active rectifier with switches, and the like. One of skill in the art will recognize other forms of a rectification section 114.

In the depicted embodiment, the load 106 includes a battery with an output voltage $V_O$. Note that the battery voltage may change, but on a small-signal level the battery voltage appears to be a substantially constant voltage, other than a small amount of ripple due to parasitics. In some embodiments, power flows from the three-phase AC power source 108 to the load 106 and, in some embodiments, power flows from the load 106 to the three-phase AC power source 108.

The three-input converter 104 provides advantages over standard two-input converters. For example, a two-input converter typically includes an input rectifier that is converted to DC and then a switching section with another rectification section, which is inefficient. In addition, the DC link section after the input rectifier typically includes a DC link voltage that is 1.25 times the peak AC input voltage, which requires higher rated components than the power converter 800 depicted in FIG. 8. Other advantages of the three-input converter 104 are described below.

The power converter 800, in some embodiments, may be used for wireless power transfer. In one embodiment, the primary transformer winding is a primary transfer pad and the secondary transformer winding is a secondary transfer pad and the primary transfer pad and the secondary transfer pad are each configured for wireless power transfer with a gap between the primary transfer pad and the secondary transfer pad. The power converters 900, 1300 of FIGS. 5 and 9 may also be used for wireless power transfer by using the transformers 112 of the power converters 900, 1300 directly or by feeding one or more converters configured for wireless power transfer.

FIG. 9 is a schematic block diagram illustrating one embodiment of a power converter 900 with an unfolder 102 and a three-input converter 902 with two primary transformer windings and two secondary windings connected in series. The power converter 900 is similar to the power converter 800 of FIG. 8 except that the three-input converter includes two transformers 112-1, 112-2 and a different switch configuration that functions in a similar way to the power converter 800 of FIG. 8.

For the first transformer 112-1, four switches $S_{X1}$, $S_{X2}$, $S_{Y1}$, $S_{Y2}$ are positioned to connect the positive terminal P and the neutral terminal O to the primary side of the first transformer 112-1. For the second transformer 112-2, four switches $S_{X3}$, $S_{X4}$, $S_{Y3}$, $S_{Y4}$ are positioned to connect the neutral terminal O and the negative terminal N to the primary side of the second transformer 112-2. The secondary sides of the first transformation 112-1 and the second transformer 112-2 are connected in series to produce a voltage $V_{XY}$ at the input of the rectification section 114 so that the three-input converter 902 operates in a similar way to the three-input converter 104 of the power converter 800 of FIG. 8. Thus, the positive terminal P, the negative terminal N and the neutral terminal O can be connected to produce a voltage $V_{XY}$ at the output of the transformers 112-1, 112-2 that is similar to operation of the power converter 800 of FIG. 8.

The three-level inverter section 904 of the three-input converter 902 includes two full-bridge rectifiers. The upper switches $S_{X1}$, $S_{X2}$, $S_{Y1}$, $S_{Y2}$ are capable of connecting the positive terminal P and neutral terminal O in either polarity to produce a first winding input voltage $V_{AB1}$. The lower switches $S_{X3}$, $S_{X4}$, $S_{Y3}$, $S_{Y4}$ are capable of connecting the neutral terminal O and negative terminal N in either polarity to produce a first winding input voltage $V_{AB2}$. The upper switches $S_{X1}$, $S_{X2}$, $S_{Y1}$, $S_{Y2}$ and the lower switches $S_{X3}$, $S_{X4}$, $S_{Y3}$, $S_{Y4}$ are controlled to produce voltage waveforms similar to those described in FIG. 2.

A controller, in some embodiments, uses a control method that closes switches $S_{X1}$, $S_{X2}$, $S_{Y1}$, $S_{Y2}$, $S_{X3}$, $S_{X4}$, $S_{Y3}$, $S_{Y4}$ of the three-input converter 902 during a portion of a switching cycle to:

simultaneously connect a voltage $V_{PO}$ from the positive terminal P to the neutral terminal O across the primary transformer winding of the first transformer 112-1 and connect a voltage $V_{NO}$ from the negative terminal N to the neutral terminal O across the primary transformer winding of the second transformer 112-2 during a first portion of a duty cycle, connect a voltage $V_{PO}$ from the positive terminal P to the neutral terminal O across the primary transformer winding of the first transformer 112-1 while a voltage $V_{NO}$ from the negative terminal N to the neutral terminal N is not connected to the primary transformer winding of the second transformer 112-2 during a second portion of the duty cycle, and connect a voltage $V_{NO}$ from the negative terminal N to the neutral terminal O across a primary transformer winding while a voltage from the positive terminal to the neutral terminal is not connected to a primary transformer winding during a second portion of the duty cycle.

The controller, in other embodiments, uses a control method that closes switches $S_{X1}$, $S_{X2}$, $S_{Y1}$, $S_{Y2}$, $S_{X3}$, $S_{X4}$, $S_{Y3}$, $S_{Y4}$ of the three-input converter 902 during a portion of a switching cycle to connect the switches $S_{X1}$, $S_{Y1}$ or $S_{X2}$, $S_{Y2}$ of the three-input converter 902 so voltage across the first primary winding $V_{AB1}$ is zero and/or to connect switches $S_{X3}$, $S_{Y3}$ or $S_{X4}$, $S_{Y4}$ of the three-input converter 902 so voltage across the second primary winding $V_{AB2}$ is zero, which ensures that the voltages $V_{AB1}$, $V_{AB2}$ are zero when desired. For example, simultaneously closing switches $S_{X1}$ and $S_{Y1}$ shorts the voltage across the primary winding of the first transformer 112-1.

For the control method above, the controller selects the first portion of the duty cycle and the second portion of the duty cycle to match current $i_P$ through the positive terminal P and current $i_N$ through the negative terminal N to current reference signals. Current $i_P$ through the positive terminal P and current $i_N$ through the negative terminal N matching the current reference signals enable the controller to direct the switches $S_a$, $S_b$, $S_c$ of the unfolder 102 to produce sinusoidal currents at the input terminals to the unfolder 102.

Figure 10:
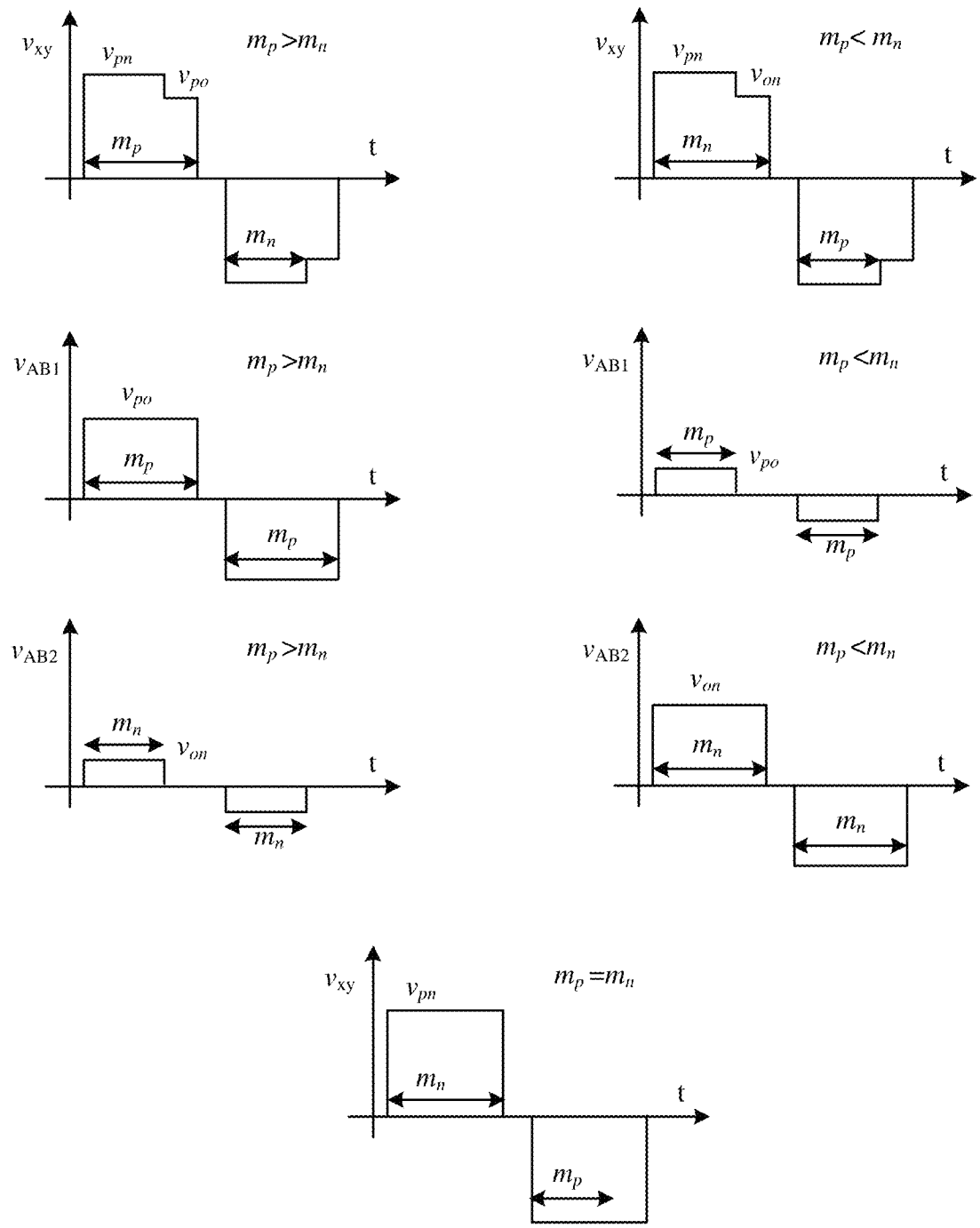
FIG. 10 is one embodiment of switching waveforms for the power converter of FIG. 9.

FIG. 10 is one embodiment of switching waveforms for the power converter 900 of FIG. 9. The waveforms on the left are for when the voltage $V_{PO}$ is greater than the voltage $V_{ON}$ and $m_p$ is greater than $m_n$. A duty cycle for half of a cycle is "m" while a portion $m_p$ of the duty cycle m corresponds to when $V_{PO}$ is greater than the $V_{NO}$ and a portion $m_n$ of the duty cycle m corresponds to when $V_{NO}$ is greater $V_{PO}$. During the portion of the duty cycle $m_p$, the voltage $V_{AB1}$ across the primary winding of the first transformers 112-1 is $V_{PO}$. During the portion of the duty cycle $m_n$, the voltage $V_{AB2}$ of the primary winding of the second transformer 112-2 is $V_{ON}$, which the voltage from the neutral terminal O to the negative terminal N. The secondary windings of the first transformer 112-1 and the second transformer 112-2 are connected in series so that the primary windings act together to produce a voltage $V_{XY}$ that is related to the voltages on the primary windings by a turns ratio n. The top left waveform depicts the voltage $V_{XY}$ and is a summation of the voltages $V_{AB1}$ and $V_{AB2}$ assuming a turns ratio of 1. Note that when $m_p$ and $m_n$ overlap, the voltage $V_{XY}$ is $V_{PN}$.

The three diagrams on the right side of FIG. 10 are for when $V_{PO}$ is less than $V_{ON}$ and $m_p$ is less than $m_n$. The resulting waveform $V_{XY}$ has voltage $V_{PN}$ during $m_p$ and then for a portion of m, the voltage $V_{XY}$ across the secondary of the transformers 112-1, 112-2 is $V_{ON}$. During a time when $V_{PO}$ equals $VO_N$, $m_p$ equals $m_n$, resulting in square waveforms, as depicted in the bottom waveform of FIG. 10.

Duty cycles $m_p$ and $m_n$ vary and voltages $V_{PO}$ and $V_{ON}$ vary during a period that is related to the fundamental frequency of the AC power source 108. The cycle depicted in FIG. 10 is much higher than a cycle of the fundamental frequency of the AC power source 108. In some embodiments, the switching frequency of the three-input converter 902 is 50-100 times the switching frequency of the unfolder 102 or higher and the fundamental frequency of the AC power source 108. The fundamental frequency of the AC power source 108 is often 60 Hertz ("Hz") or 50 Hz, but could also be higher. The switching frequency of the unfolder 102 is typically twice the fundamental frequency of the AC power source 108. Having a higher switching frequency for the three-input converter 902 than the switching frequency of the unfolder 102 is advantageous and the advantages are explained below.

Figure 11:
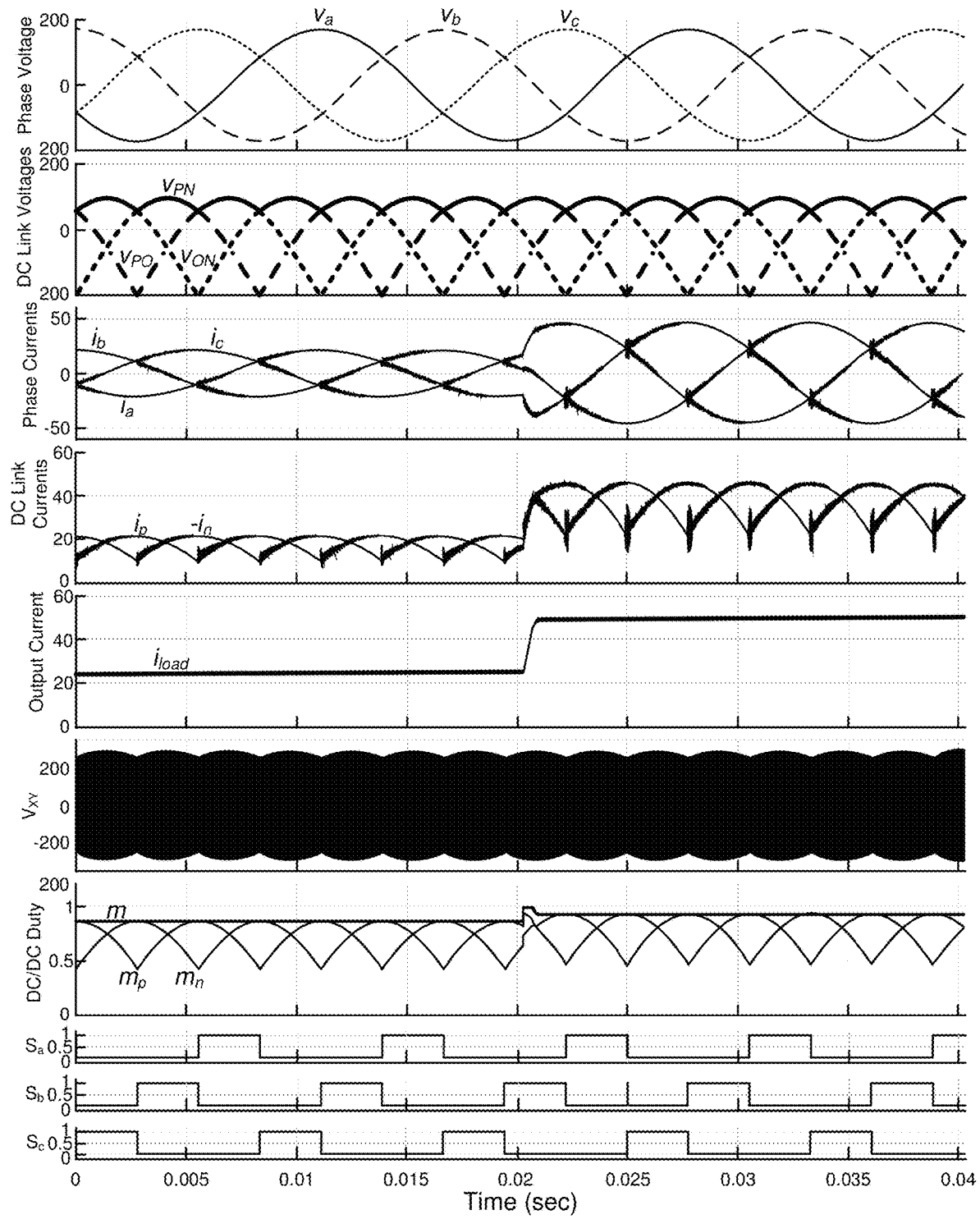
FIG. 11 is one embodiment of additional switching waveforms for the power converter of FIG. 9.

In some embodiments, the duty cycle m varies to control power to the load 106 while the duty cycles $m_p$ and $m_n$ vary to shape current signals $i_p$ and $i_n$ so the unfolder 102 is able to construct sinusoidal current waveforms at the input to the unfolder 102. FIG. 11 is one embodiment of additional switching waveforms for the power converter of FIG. 9. The waveforms in FIG. 11 are on a time scale of the fundamental frequency of the AC power source 108 so that hundreds or thousands of switching cycles of the three-input converter 902 occur in the waveforms depicted in FIG. 11.

The top waveform is phase voltage and the second waveform is DC link voltage at the output terminals P, O, N of the unfolder 102, which is similar to the third waveform of FIG. 2. The third waveform depicts phase currents $i_a$, $i_b$ and $i_c$, which are substantially sinusoidal, but include some switching noise and ripple. Switching of the unfolder 102 and three-input converter 902 and the associated control method are designed to create the sinusoidal phase currents, as explained below.

The fourth waveform of FIG. 11 depicts DC link currents $i_p$, which is the current in the positive terminal P, and $-i_n$, which is the current of in the negative terminal N, but with a reversed polarity to demonstrate how the two currents are related. The load current $i_{load}$ is depicted in the fifth waveform, and is primarily constant except for a minor amount of ripple. Note that when the load 106 is a battery or a load that typically has a constant voltage at the time scale depicted in FIG. 11, the load 106 appears to be mostly constant power. Note that a load change is initiated at about 0.02 seconds where the load 106 increases. The current waveforms $i_p$, $-i_n$ and $i_{load}$ change, but DC link voltages $V_{PN}$, $V_{PO}$, $V_{ON}$ and AC power source 108 voltages remain the same.

Having the neutral leg of the three-input converter 902 and an unfolder 102 instead of a typical full-bridge rectifier allows for AC waveforms in additional to the DC waveform of $V_{PN}$. The DC link voltage $V_{PO}$ and $V_{ON}$ allow for the DC link currents so that the unfolder 102 uses the shaped DC link currents $i_p$, $i_n$ to create the sinusoidal phase currents $i_a$, $i_b$, $i_c$. The controller determines the proper overall duty cycle m to meet power requirements and then determines partial duty cycles $m_p$ and $m_n$ to create the DC link currents $i_p$, $i_n$ by drawing current from the capacitors $C_p$ and $C_n$. Current reference signals are used to determine the partial duty cycles $m_p$ and $m_n$, which are depicted in the DC/DC duty waveform, which is the second from the bottom in FIG. 11. As can be seen from the $V_{XY}$ waveform, switching occurs on a time scale that the $V_{XY}$ waveform appears solid except for ripple at the top and bottom on the same time scale as the voltage ripple for $V_{PN}$.

As can be seen from the DC/DC Duty waveform, the overall duty cycle m remains constant for a constant load while the partial duty cycles $m_p$ and $m_n$ vary on a time scale related to the switching frequency of the unfolder 102. The partial duty cycles $m_p$ and $m_n$ vary so that $m_p$ is greater than $m_n$ for a portion of time, $m_p$ equals $m_n$ for a brief amount of time, and $m_p$ is less than $m_n$ for a portion of time. As $m_p$ and $m_n$ vary, the magnitudes of $V_{PO}$ and $V_{ON}$ also vary in the waveforms depicted in FIG. 10.

The bottom three waveforms of FIG. 11 depict switching signals for the switches $S_a$, $S_b$, $S_c$ of the unfolder 102. The switching periods are very regular for the unfolder and typically only vary as the fundamental frequency of the AC power source 108 varies.

Note that $m_p$ and $m_n$ start at the same time and $m_n$ turns off earlier than $m_p$. In other embodiments, switch turn-on and turn-off times can be modified to have $m_n$ symmetrical with $m_p$ or to have $m_n$ and $m_p$ end at the same time. Each method results in different advantages and disadvantages. One advantage of the switching method depicted in FIG. 10 is that soft switching is easier to achieve, which results in higher efficiency than other switching methods not using soft switching.

Figure 12:
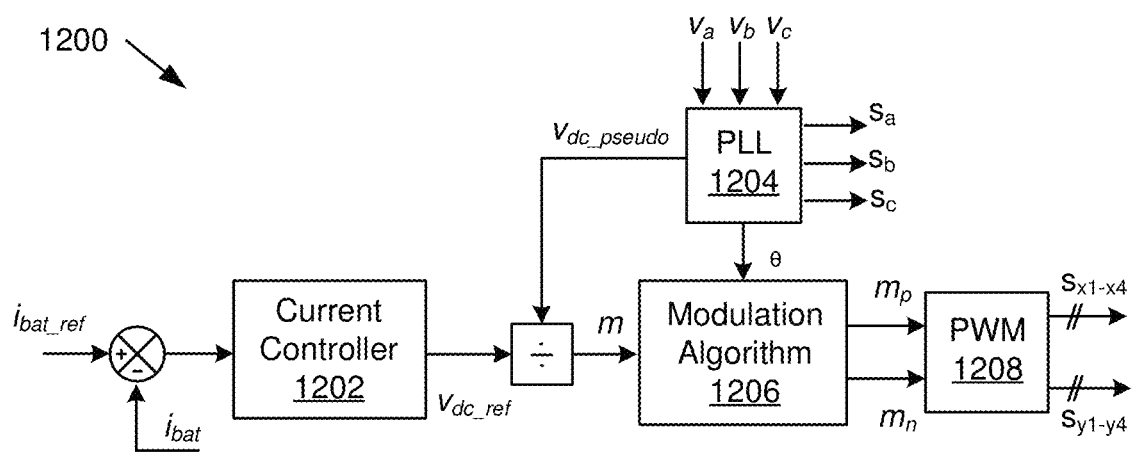
FIG. 12 is a schematic block diagram illustrating one embodiment of a control circuit for a power converter, such as the power converter of FIG. 9.

FIG. 12 is a schematic block diagram illustrating one embodiment of a control circuit 1200 for a power converter, such as the power converter 900 of FIG. 9. Current control to the load 106 is process that is typically much slower than switching of three-input converter 902 so a reference current is compared to the load current to generate an error signal to be fed to the current controller 1202, which generates a DC voltage reference $V_{dc\_ref}$ used to then generate a duty cycle m. In the depicted embodiment, the load 106 is a battery so a battery current reference $b_{bat\_ref}$ is compared to battery current $i_{bat}$.

A phase-lock loop ("PLL") circuit 1204 receives phase voltages $V_a$, $V_b$, $V_c$ and generates switching signals for the switches $S_a$, $S_b$, $S_c$ of the unfolder 102. The PLL circuit 1204 also generates a phase θ for a modulation algorithm 1206. The PLL circuit 1204 also generates a calculated DC voltage $V_{dc\_pseudo}$, which is used with the DC voltage reference $V_{dc\_ref}$ to determine an overall duty cycle m, which is used by the modulation algorithm 1206 along with the phase θ to generate the partial duty cycles $m_p$ and $m_n$, which are then fed to a pulse-width modulation ("PWM") circuit 1208 to generate signals for the switches $S_{X1-X4}$, $S_{Y1-Y4}$ of the three-input converter 902.

Figure 13:
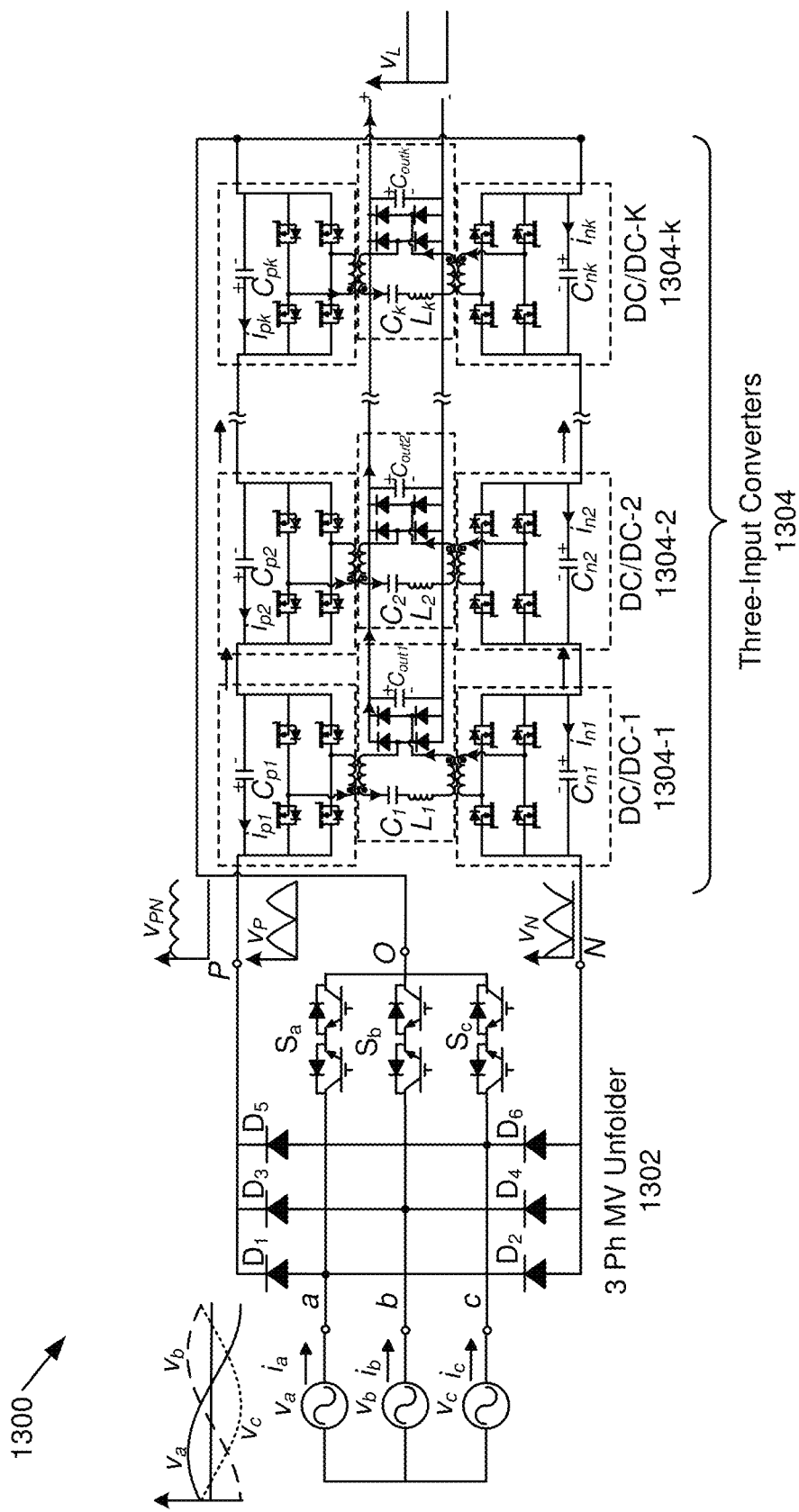
FIG. 13 is a schematic block diagram illustrating one embodiment of a power converter with an unfolder and a plurality of three-input converters with primary-side circuits stacked in series and secondary windings connected in parallel.

FIG. 13 is a schematic block diagram illustrating one embodiment of a power converter 1300 with an unfolder 1302 and a plurality of three-input converters 1304-1 to 1304-k (collectively "1304") with primary-side circuits stacked in series and secondary windings connected in parallel. The power converter 1300 is appropriate for higher input voltages and lower output voltages. For example, the AC power source 108 may be from a 4.16 kV grid while the output voltage may be 800 V, which may be suitable for battery charging for wired or wireless charging.

For the first three-input converter 1304-1, switches feeding the primary winding of a first transformer 112-1 are connected across a first positive capacitor $C_{p1}$ while switches feeding the primary winding of a second transformer 112-2 are connected across a first negative capacitor $C_{n1}$. A capacitor $C_1$ and inductor $L_1$ are connected between the transformer primaries to achieve soft switching so that the capacitor $C_1$ and inductor $L_1$ are sized so that the first three-input converter 1304-1 is a resonant converter. The switches and capacitors $C_{p1}$-$C_{pk}$ of the positive side of the three-input converters 1304 are connected in series between the positive terminal P and the neutral terminal O of the unfolder 1302. Likewise, the switches and capacitors $C_{n1}$-$C_{nk}$ of the negative side of the three-input converters 1304 are connected in series between the negative terminal N and the neutral terminal O of the unfolder 1302. The outputs of the three-input converters 1304 are connected in parallel to feed a load 106.

Each three-input converter 1304 includes two positive input connections connected to switches (e.g. $S_{X1-X2}$, $S_{Y1-Y2}$) to connect to the first primary transformer winding of the first transformer 112-1 of the three-input converter 1304 and two negative input connections connected to switches (e.g. $S_{X3-X4}$, $S_{Y3-Y4}$) to connect to the second primary transformer winding of the second transformer 112-2.

Advantageously, the unfolder switches $S_a$, $S_b$, $S_c$ are rated for voltages of the AC power source 108 and switch at a relatively low switching rate. Where the AC power source 108 has higher voltages, such as in the medium voltage range (e.g. above 1200 V) or higher, off-the-shelf switches that operate efficiently at lower switching rates are generally available. For example, the unfolder switches $S_a$, $S_b$, $S_c$ may be insulated-gate, bipolar transistor ("IGBT") switches, which are readily available at higher voltage ratings. In addition, the unfolder switches $S_a$, $S_b$, $S_c$ may be stacked to increase voltage capacities. Circuitry may also be used to ensure equal voltage sharing across stacked switches.

Where the three-input converters 1304 are stacked, voltage requirements of the switches $S_{X1-X4}$, $S_{Y1-Y4}$ of the three-input converters 1304 are lower. For example, where the maximum voltage $V_{PO}$ across the positive terminal P to neutral terminal O is 10,000 V and there are ten stacked three-input converters (e.g. 1304-1 to 1304-10), the voltage across each input capacitor $C_{p1-p10}$, $C_{n1-n10}$ is typically 1,000 V so the switches $S_{X1-X4}$, $S_{Y1-Y4}$ of the three-input converters 1304-1 to 1304-10 may be rated based on the 1,000 V at the input capacitors $C_{p1-p10}$, $C_{n1-b10}$.

Where the three-input converters 1304 are switching at a relatively high switching rate compared to the unfolder 1302, off-the-shelf switches that operate efficiently at the lower voltages are much more readily available than switches that have a high voltage rating and are efficient at higher switching frequencies. For example, the switches $S_{X1-X4}$, $S_{Y1-Y4}$ of the three-input converters 1304 may be metal-oxide semiconductor field effect transistors ("MOSFET"). The number of three-input converters 1304 is one degree of design freedom when designing an appropriate power converter 1300 for a particular input voltage and a particular output voltage and for power delivery requirements.

Figure 14:
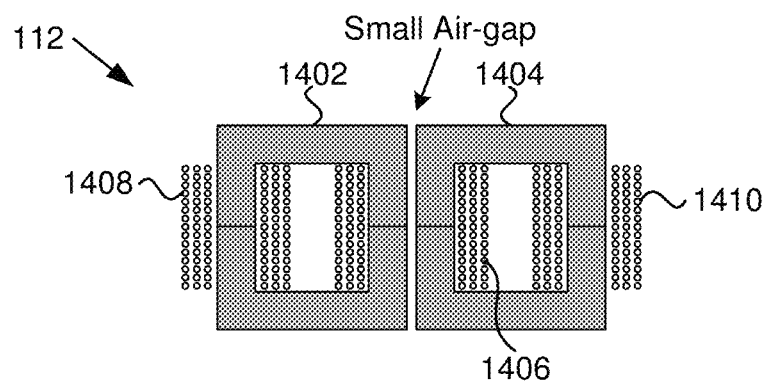
FIG. 14 is a schematic circuit diagram illustrating integrated magnetics.
Figure 14:
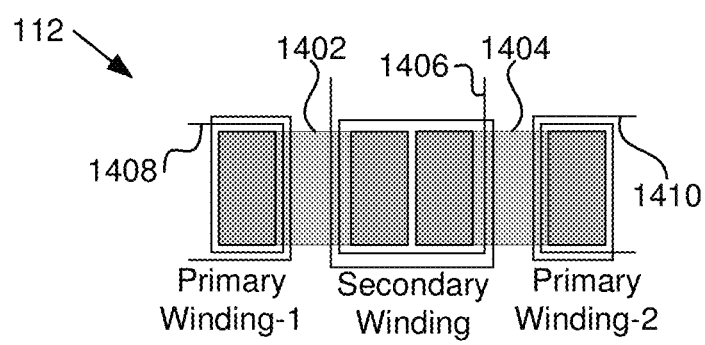

FIG. 14 is a schematic circuit diagram illustrating integrated magnetics, which is one possible solution for a power converter 900, 1300 with two transformers 112-1, 112-2 (collectively "112") with two primary windings. The fundamental idea of the transformer magnetic structure is that the flux linkages of the two primary windings add-up on the secondary winding. The top diagram is a side cross-sectional view and the bottom diagram is a top cross-sectional view of a transformer 112. The secondary side of the transformer 112 is integrated by placing two transformer cores 1402, 1404 adjacent to each other and winding the secondary winding 1406 around both cores 1402, 1404. The first primary winding 1408 is wound around an outer portion of one core 1402 and the second primary winding 1410 is wound around an outer portion of the other core 1404. In some embodiments, there is a small air gap between the cores 1402, 1404 where the air gap is sized to be big enough to decouple the primary windings 1408, 1410. In the depicted embodiments, the turns ratios of the transformers 112-1, 112-2 are the same. Other embodiments include other turns ratios. Typically, the turns ratios of each transformer 112-1, 112-2 are the same.

Figure 15:
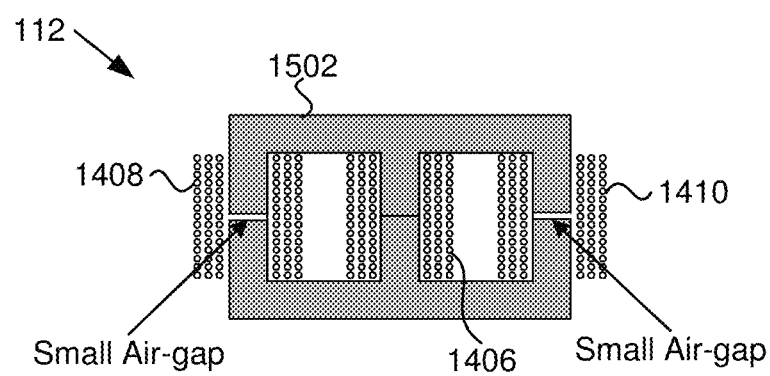
FIG. 15 is a schematic circuit diagram illustrating integrated magnetics with a single core.
Figure 15:
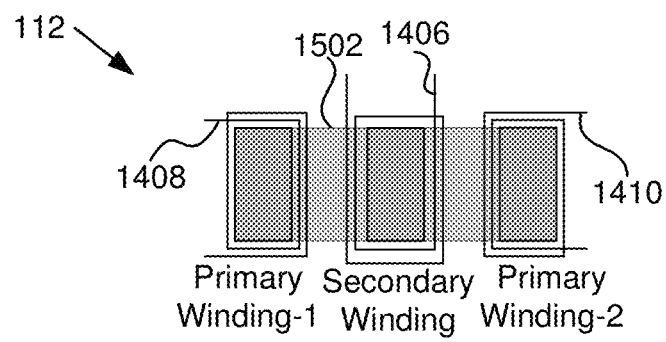

FIG. 15 is a schematic circuit diagram illustrating integrated magnetics with a single core 1502, which is another possible solution for a power converter 900 with a single transformer 112 with two primary windings. The transformer 112 is fundamentally similar to the transformers 112-1, 112-2 of FIG. 14 except that a single core is used instead of two cores. One of skill in the art will recognize other structure that will function with the described power converters 800, 900, 1300.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A power converter comprising:
an unfolder comprising an input connection comprising three input terminals that connect to a three-phase alternating current ("AC") power source with each of the three phases spaced 120 degrees apart and comprising an output connection with a positive terminal, a negative terminal and a neutral terminal, wherein the unfolder unfolds bipolar AC voltages into two unipolar piece-wise sinusoidal direct current ("DC") voltages offset from each other by a half of a period, each of the unipolar piece-wise sinusoidal voltages comprising a semi-triangular waveform comprising rising and falling portions of voltages of the three-phase AC power source, wherein the unfolder comprises one or more switches connected between the neutral terminal and each of the input terminals, the one or more switches are switched and contribute to generation of the two unipolar piece-wise sinusoidal voltages; and
a three-input converter that produces a DC voltage output across output terminals, the three-input converter comprising a positive input connection connected to the positive terminal, a negative input connection connected to the negative terminal and a neutral input connection connected to the neutral terminal, wherein the positive input connection, the negative input connection and the neutral input connection receive the two unipolar piece-wise sinusoidal voltages, wherein the three-input converter comprises switches that selectively connect a voltage to the positive, negative and neutral input connections across a primary transformer winding of a transformer, wherein a secondary transformer winding of the transformer is connected to the output terminals through a rectification section.

2. The power converter of claim 1, wherein a voltage across the positive terminal and the negative terminal comprises a DC voltage with an AC ripple and wherein a voltage range of a voltage across the positive terminal to the neutral terminal overlaps a voltage range of a voltage across the negative terminal to the neutral terminal.

3. The power converter of claim 1, wherein a switching frequency of switches in the three-input converter is at least 100 times a switching frequency of the unfolder.

4. The power converter of claim 1, wherein the three-input converter comprises a first primary transformer winding and a second primary transformer winding with at least one secondary transformer winding connected to a rectification section connected to the output terminals, wherein the three-input converter comprises switches to connect each of the positive and neutral terminals to the first primary transformer winding and switches to connect each of the negative and neutral terminals to the second primary transformer winding.

5. The power converter of claim 4, wherein the three-input converter comprises a plurality of three-input converters, wherein each three-input converter comprises two positive input connections connected to switches to connect to the first primary transformer winding of the three-input converter and two negative input connections connected to switches to connect to the second primary transformer winding and wherein the positive input connections of the plurality of three-input converters are connected in series between the positive terminal and the neutral terminal and the negative input connections of the plurality of three-input converters are connected in series between the negative terminal and the neutral terminal and wherein output terminals of the plurality of three-input converters are connected in parallel.

6. The power converter of claim 5, wherein the one or more switches between an input terminal of the unfolder and the neutral terminal are rated for voltages of the AC power source and wherein switches of the plurality of three-input converters connected to a primary transformer winding are rated for voltages across the positive terminal, negative terminal and neutral terminal divided by the number of three-input converters of the plurality of three-input converters.

7. The power converter of claim 1, wherein the transformer comprises one or two primary transformer windings and the power converter further comprises a controller that closes switches of the three-input converter during a portion of a switching cycle to:
simultaneously connect a voltage from the positive terminal to the neutral terminal across a primary transformer winding and connect a voltage from the negative terminal to the neutral terminal across a primary transformer winding during a first portion of a duty cycle;
connect a voltage from the positive terminal to the neutral terminal across a primary transformer winding while a voltage from the negative terminal to the neutral terminal is not connected to a primary transformer winding during a second portion of the duty cycle;
connect a voltage from the negative terminal to the neutral terminal across a primary transformer winding while a voltage from the positive terminal to the neutral terminal is not connected to a primary transformer winding during a second portion of the duty cycle; and
connect switches of the three-input converter so voltage across a primary transformer winding is zero.

8. The power converter of claim 7, wherein the controller selects the first portion of the duty cycle and the second portion of the duty cycle to match current through the positive terminal and current through the negative terminal to current reference signals, wherein current through the positive terminal and current through the negative terminal matching the current reference signals enable the controller to direct switches of the unfolder to produce sinusoidal currents at the input terminals to the unfolder.

9. The power converter of claim 1, wherein the unfolder comprises a full-bridge rectification section connecting each of the three input terminals of the unfolder to the positive terminal and the negative terminal and switches connecting each of the three input terminals to the neutral terminal.

10. The power converter of claim 9, wherein the full-bridge rectification section comprises one or more of diodes and switches.

11. The power converter of claim 9, wherein the switches switch at a frequency that is twice a fundamental frequency of the AC power source.

12. The power converter of claim 1, wherein the three-input converter is a resonant converter and comprises inductance and capacitance on a primary side of the transformer sufficient for the switches of the three-input converter to switch in a zero-voltage-switching mode.

13. The power converter of claim 1, wherein the rectification section of the three-input converter comprises a full-bridge rectifier.

14. The power converter of claim 1, wherein the unfolder and three-input converter are operated to produce a first power waveform measured at the positive terminal and neutral terminal and a second power waveform measured at the negative terminal and the neutral terminal wherein the first power waveform is offset from the second power waveform by a half of a cycle of the power waveforms and wherein the first power waveform and the second power waveform add to produce a constant power waveform.

15. The power converter of claim 1, wherein the primary transformer winding comprises a primary transfer pad and the secondary transformer winding comprises a secondary transfer pad, wherein the primary transfer pad and the secondary transfer pad are each configured for wireless power transfer with a gap between the primary transfer pad and the secondary transfer pad.

16. A power converter comprising:
an unfolder comprising an input connection with three input terminals that connect to a three-phase alternating current ("AC") power source and comprising an output connection with a positive terminal, a negative terminal and a neutral terminal, wherein the unfolder unfolds the bipolar AC voltages into two unipolar piece-wise sinusoidal direct current ("DC") voltages offset from each other by a half of a period; and
a plurality of three-input converters that produce a DC voltage output across output terminals, each three-input converter comprises a first primary transformer winding and a second primary transformer winding with at least one secondary transformer winding connected to a rectification section connected to the output terminals, wherein each three-input converter comprises switches to connect two positive input connections to the first primary transformer winding and switches to connect two negative input connections to the second primary transformer winding,
wherein the positive input connections of the plurality of three-input converters are connected in series between the positive terminal and the neutral terminal,
wherein the negative input connections of the plurality of three-input converters are connected in series between the neutral terminal and the negative terminal, and
wherein the output terminals of the plurality of three-input converters are connected in parallel.

17. The power converter of claim 16, further comprising a controller that closes switches of the plurality of three-input converters during a portion of a switching cycle to:
simultaneously connect a voltage from the positive terminal to the neutral terminal across a primary transformer winding and connect a voltage from the negative terminal to the neutral terminal across a primary transformer winding during a first portion of a duty cycle;
connect a voltage from the positive terminal to the neutral terminal across a primary transformer winding while a voltage from the negative terminal to the neutral terminal is not connected to a primary transformer winding during a second portion of the duty cycle;
connect a voltage from the negative terminal to the neutral terminal across a primary transformer winding while a voltage from the positive terminal to the neutral terminal is not connected to a primary transformer winding during a second portion of the duty cycle;
connect switches of the three-input converters so voltage across the first primary transformer winding is zero; and
connect switches of the three-input converters so voltage across the second transformer winding is zero.

18. The power converter of claim 17, wherein the controller selects the first portion of the duty cycle and the second portion of the duty cycle to match current through the positive terminal and current through the negative terminal to current reference signals, wherein current through the positive terminal and current through the negative terminal matching the current reference signals enable the controller to direct switches of the unfolder to produce sinusoidal currents at the input terminals to the unfolder.

19. The power converter of claim 16, wherein the unfolder comprises a full-bridge rectification section connecting each of the three input terminals of the unfolder to the positive terminal and the negative terminal and switches connecting each of the three input terminals to the neutral terminal.

20. A power converter comprising:
an unfolder comprising an input connection comprising three input terminals that connect to a three-phase alternating current ("AC") power source and comprising an output connection with a positive terminal, a negative terminal and a neutral terminal, wherein the unfolder unfolds the bipolar AC voltages into two unipolar piece-wise sinusoidal direct current ("DC") voltages offset from each other by a half of a period; and
a three-input converter that produces a DC voltage output across output terminals, the three-input converter comprising a positive input connection connected to the positive terminal, a negative input connection connected to the negative terminal and a neutral input connection connected to the neutral terminal, wherein the three-input converter comprises switches that selectively connect a voltage to the positive, negative and neutral input connections across a primary transformer winding of a transformer, wherein a secondary transformer winding of the transformer is connected to the output terminals through a rectification section; and
a controller, wherein the transformer comprises one or two primary transformer windings and the controller closes switches of the three-input converter during a portion of a switching cycle to:
simultaneously connect a voltage from the positive terminal to the neutral terminal across a primary transformer winding and connect a voltage from the neutral terminal to the negative terminal across a primary transformer winding during a first portion of a duty cycle;
connect a voltage from the positive terminal to the neutral terminal across a primary transformer winding while a voltage from the neutral terminal to the negative terminal is not connected to a primary transformer winding during a second portion of the duty cycle;
connect a voltage from the neutral terminal to the negative terminal across a primary transformer winding while a voltage from the positive terminal to the neutral terminal is not connected to a primary transformer winding during a second portion of the duty cycle; and
connect switches of the three-input converter so voltage across a primary transformer winding is zero,
and wherein the controller selects the first portion of the duty cycle and the second portion of the duty cycle to match current through the positive terminal and current through the negative terminal to current reference signals, wherein current through the positive terminal and current through the negative terminal matching the current reference signals enable the controller to direct switches of the unfolder to produce sinusoidal currents at the input terminals to the unfolder.

* * * * *